United States Patent
Noritake et al.

[11] Patent Number: 6,100,584
[45] Date of Patent: Aug. 8, 2000

[54] GLASS BOARD USED IN THE PRODUCTION OF LIQUID CRYSTAL PANELS

[75] Inventors: Kazuto Noritake, Gifu; Takao Suzuki; Norio Oku, both of Gifu-ken; Minoru Nakano, Tokyo, all of Japan

[73] Assignee: Sanyo Electric Co., Ltd., Osaka, Japan

[21] Appl. No.: 09/047,750

[22] Filed: Mar. 25, 1998

[30] Foreign Application Priority Data

Mar. 31, 1997 [JP] Japan ..................................... 9-080958

[51] Int. Cl.⁷ .......................... H01L 23/04; G02F 1/1333
[52] U.S. Cl. ............................................. 257/730; 349/126
[58] Field of Search ................................ 257/72, 59, 620, 257/730, 619; 349/126, 192, 187, 73

[56] References Cited

U.S. PATENT DOCUMENTS

| | | | |
|---|---|---|---|
| 4,259,682 | 3/1981 | Gamo ........................................ | 357/55 |
| 4,597,636 | 7/1986 | Hoshikawa .............................. | 350/334 |
| 5,247,191 | 9/1993 | Yamazaki et al. ....................... | 257/72 |
| 5,353,141 | 10/1994 | Onuma et al. ............................ | 359/76 |
| 5,521,409 | 5/1996 | Hshieh et al. ........................... | 257/341 |
| 5,572,045 | 11/1996 | Takahashi et al. ....................... | 257/59 |
| 5,818,560 | 10/1998 | Kouno et al. ............................ | 349/129 |
| 5,835,177 | 11/1998 | Dohjo et al. .............................. | 257/59 |
| 5,844,650 | 12/1998 | Saito et al. ............................... | 349/126 |
| 5,867,236 | 2/1999 | Babuka et al. ............................ | 349/73 |

*Primary Examiner*—David Hardy
*Assistant Examiner*—Bradley W. Baumeister
*Attorney, Agent, or Firm*—Sheridan Ross P.C.

[57] ABSTRACT

A mother glass board used to fabricate multiple liquid crystal display panels includes a substrate on which the liquid crystal panel portions are formed. An orientation film is formed on the liquid crystal panel portions. A pattern of metallic film is formed on the substrate outside that portion of the substrate on which the liquid crystal panel portions are located. The patterns include an alignment mark and an identifier mark used in the liquid crystal panel production process. An enclosure surrounding the liquid crystal panel portions is formed on the substrate between the pattern and the liquid crystal panel portions. The enclosure prevents stripes from being formed on the orientation film during a rubbing step in the production process in which the liquid crystal panel portions are rubbed with a cloth.

6 Claims, 3 Drawing Sheets

GLASS BOARD USED IN THE PRODUCTION OF LIQUID CRYSTAL PANELS

BACKGROUND OF THE INVENTION

The present invention relates to a glass board and, more particularly, to a mother glass board used to produce a plurality of liquid crystal panels.

Referring to FIG. 1, a conventional mother glass board 10 used to construct one or more liquid crystal panels comprise a substrate 101, a plurality of liquid crystal panel portions 102a–102d disposed on the substrate 101, and a plurality of patterns 103. The substrate 101 is a large, single plate of glass. The liquid crystal panel portions 102a–102d comprise a panel portion with pixel drive elements or a drive element panel portion, and a panel portion with black matrices, or a black matrix panel portion. The patterns 103 are fabricated of a metallic film formed on the substrate 101 and are located on a portion or area of the substrate 101 other than a portion or area of the substrate 101 where the liquid crystal panel portions 102a–102d are located. The patterns 103 include an alignment mark for various masks and an identifier mark by various devices in the liquid crystal panel production process. An orientation film 104 is provided over each of the liquid crystal panel portions 102a–102d.

The process of producing the liquid crystal panel portions 102a–102d includes an orientation film rubbing step. In the rubbing step, a surface of the orientation film 104 is rubbed with a rubbing roll 105, which rotates in the direction indicated by the arrow A (FIG. 1). The rubbing roll comprises cloth or similar material. Since the patterns 103 project from the substrate 101, a trace of the patterns 103 is formed on the surface of the rubbing roll 105. Thus, when rubbing the surface of the orientation film 104 with the rubbing roll 105 (having a trace of the patterns 103 thereon), the trace causes a stripe 104a to be formed on the orientation film 104. The stripe 104a causes problems during the remainder of the liquid crystal panel production process, which makes it difficult to produce liquid crystal panels capable of displaying high quality pictures or images.

Accordingly, it is an object of the present invention to provide a mother glass board for fabricating high quality liquid crystal panels.

SUMMARY OF THE INVENTION

To achieve the above objective, the present invention provides a mother glass board comprising: a substrate; a plurality of liquid crystal panel portions located on the substrate; and an enclosure surrounding the liquid crystal panel portions.

The present invention further provides a mother glass board comprising: a substrate; a plurality of liquid crystal panel portions located on the substrate, wherein each liquid crystal panel portion is covered with an orientation film, the substrate including a first region, where the liquid crystal panel portions are located, and a second region excluding the first region; and at least one projection disposed on the second region of the substrate, wherein the orientation film of at least one liquid crystal panel portion adjacent to the projection extends over the projection.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and, advantages thereof, may best be understood by referent to the following description of the presently preferred embodiments together with the accompanying drawings in which.

DETAILED DESCRIPTION OF THE PREFERRED EMBODIMENTS

Figure 1:
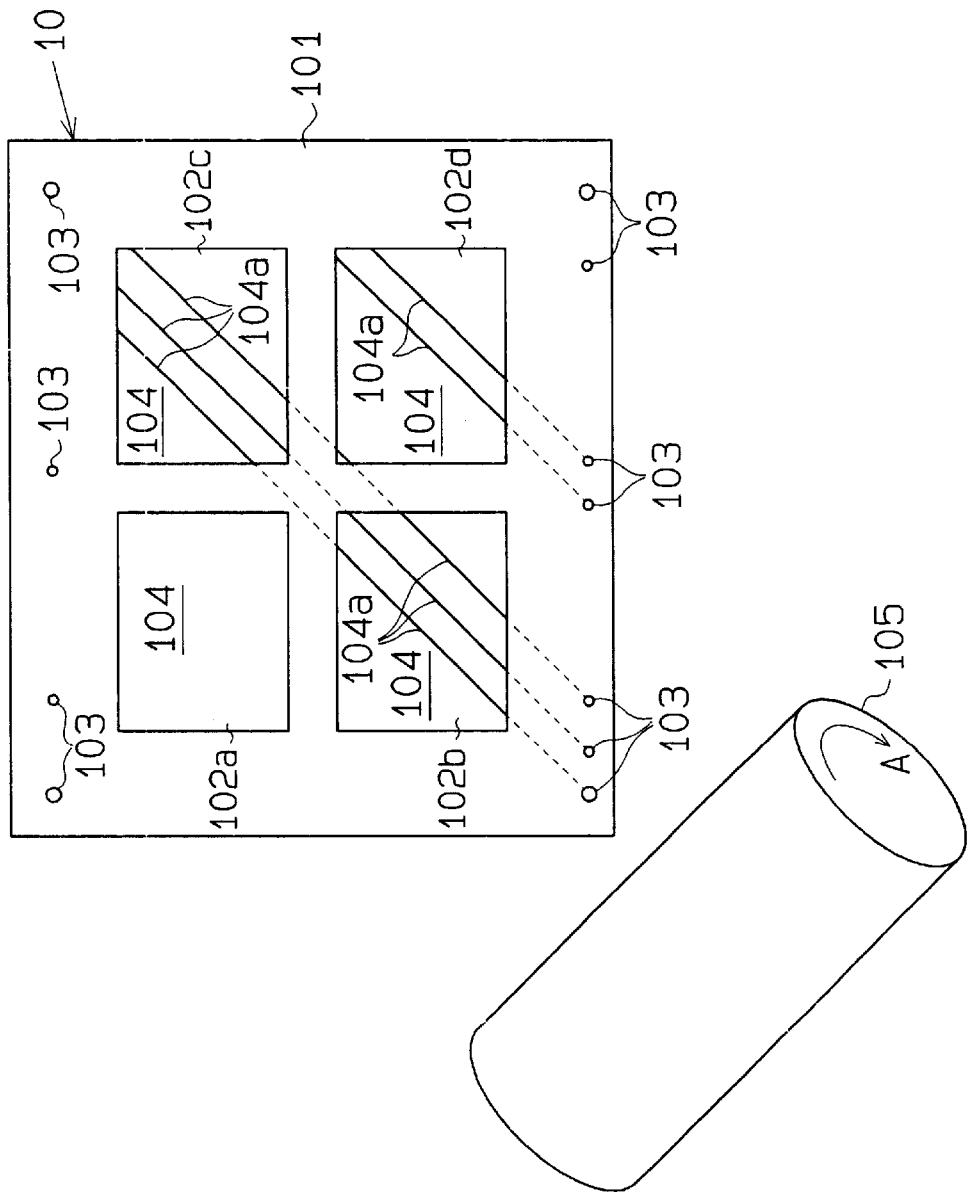
FIG. 1 is a plan view showing a conventional mother glass board.

In the drawings, like numerals are used to designate like elements throughout.

First Embodiment

Figure 2:
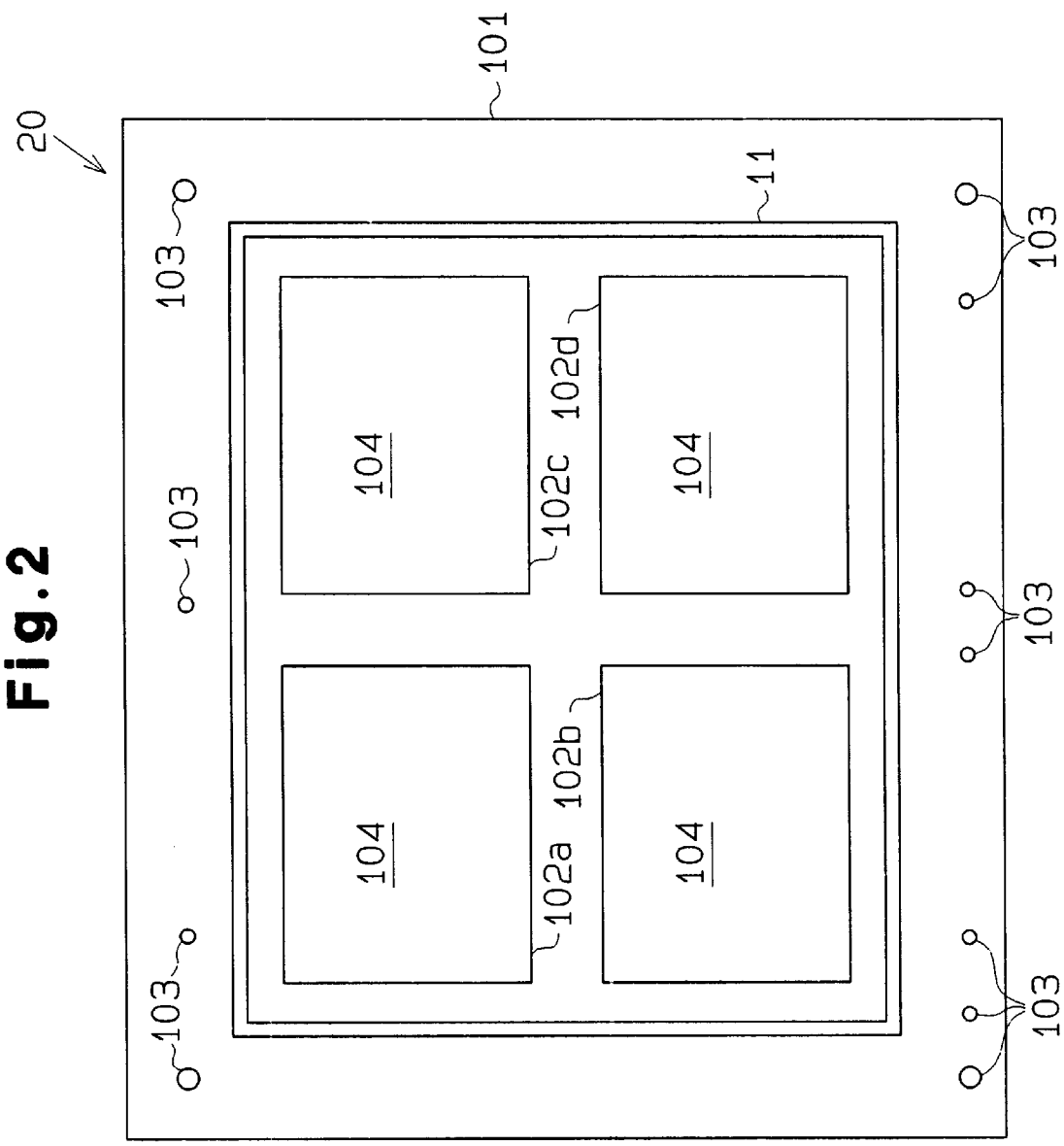
FIG. 2 is a plan view showing a mother glass board in accordance with a first embodiment of the present invention.

The first embodiment of the present invention will now be described referring to drawings. Referring to FIG. 2, a plurality of liquid crystal panel portions 102a–102d are arranged in a matrix form on a substrate 101 of mother glass board 20. Preferably, the mother glass board 20 is square shaped, although other shapes, such as rectangular may also be used. There are two kinds of mother glass board 20. One type of mother glass board 20 has a black matrix arranged on one side of the substrate 101. The other type of mother glass board 20 has a drive element arranged on one side of the substrate 101. The present invention is applicable to either kind of the mother glass board 20.

An enclosure 11 located on a surface of the substrate 101 surrounds the liquid crystal panel portions 102a–102d. The enclosure 11 projects on the substrate 101 and preferably continues with no gaps, thereby forming an unbroken pattern. In an area outside the enclosure 11, the patterns 103, which may be projections, such as of a metallic film, are formed. The enclosure 11 delineates the patterns 103 from the liquid crystal panel portions 102a–102d.

Figure 3A:
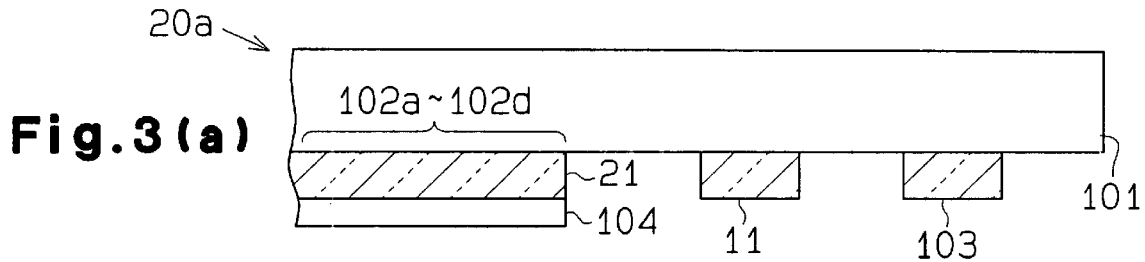
FIG. 3(a) is a cross-sectional view showing a black matrix side of the mother glass board of FIG. 2.

Referring now to FIG. 3(a), the mother glass board of the black matrix type has a black matrix 21. The black matrix 21 preferably contains a chrome film. The orientation film 104 is disposed over the black matrix 21 and preferably contains a polyimide resin. The orientation film 104 and the black matrix 21 are disposed in the area corresponding to the liquid crystal panel portions 102a–102d. The enclosure 11 is preferably made of the same material and in the same process as the black matrix 21.

Figure 3B:
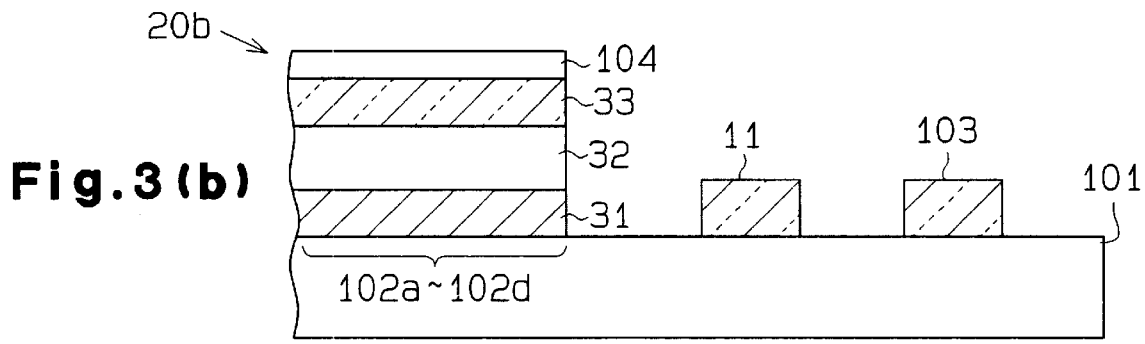
FIG. 3(b) is a cross-sectional view of a drive element side of the mother glass board of FIG. 2.

As shown in FIG. 3(b), on the mother glass board 20b of the pixel drive element type, an electrode 31 of the pixel drive element, a layer insulation film 32, a transparent display electrode 33 preferably containing ITO and the orientation film 104 preferably containing a polyimide resin, are stacked in the area corresponding to the liquid crystal panel portions 102a–102d. The enclosure 11 is preferably made of the same material and in the same process as the transparent display electrode 33.

In the production of a liquid crystal panel, the surface of the orientation film 104 formed on the liquid crystal panel portions 102a–102d is rubbed with the rubbing roll during the rubbing process as previously discussed. In the rubbing process, the patterns 103 on the mother glass board 20 form a trace of the patterns 103 on the surface of the rubbing roll. The trace on the rubbing roll surface is rubbed off when the rubbing roll 105 is leveled with the enclosure 11 surrounding the liquid crystal panel portions 102a–102d. Therefore, stripes are not formed on the orientation film 104. As a result, deterioration in the display performance of the liquid crystal panel portions 102a–102d is prevented and liquid crystal panels with a high picture quality are provided.

Second Embodiment

Figure 4A:
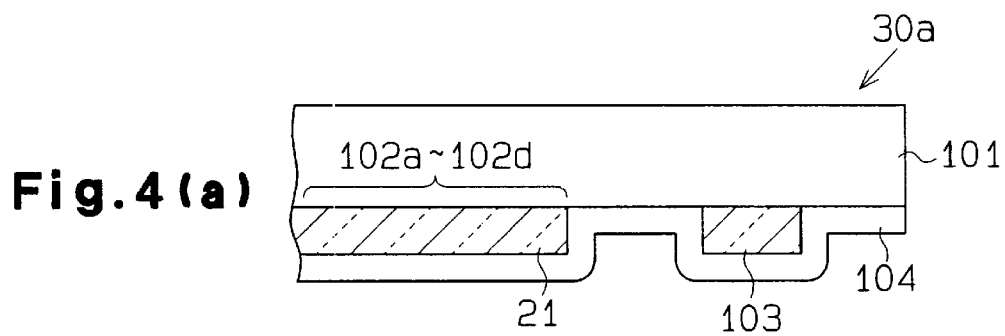
FIG. 4(a) is a cross-sectional view showing a black matrix side of a mother glass board based on a second embodiment of the present invention.
Figure 4B:
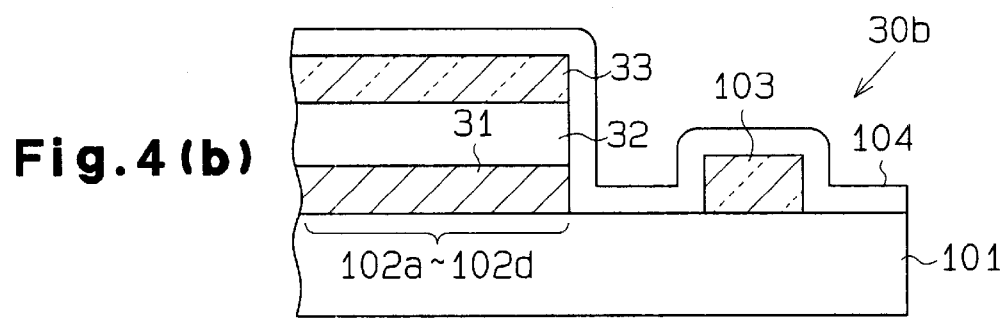
FIG. 4(b) is a cross-sectional view showing of the drive element side of the mother glass board.

A second embodiment of the present invention will now be described referring to FIG. 4(*a*) and FIG. 4(*b*). According to the second embodiment, the mother glass board 30*a* comprises a substrate 101 having a plurality of liquid crystal panel portions 102a–102d formed thereon. The black matrix type glass board 30*a* (FIG., 4(*a*)) has a black matrix 21 disposed over the liquid crystal panel portions 102a–102d. A metallic film pattern 103 is located in an area of the substrate 101 outside the area of the liquid crystal panel portions 102a–102d. The substrate 101, the liquid crystal panel portions 102a–102d, and the pattern 103 are covered with an orientation film 104. The pixel drive type glass board 30*b* (FIG. 4(*b*)) comprises a substrate 101 having an electrode 31, a layer insulation film 32 and a transparent display electrode 33 stacked over the liquid crystal panel portions 102a–102d. A metallic film pattern 103 is located in the are of the substrate 101 outside the liquid crystal panels 102a–102d. The substrate 101, the stacked electrodes 31, 33, the insulation film 32 and the pattern 103 all have an orientation film 104 formed thereon.

The mother glass board 30*a*/30*b* of the second embodiment is different from the mother glass board 20 in the following points.

(1) The enclosure 11 is omitted.

(2) The orientation film 104 is formed on the whole surface of the substrate 101 including the patterns 103, as well as on the liquid crystal panel portions 102a–102d.

Though the patterns 103 project from the substrate 101, as the substrate surface is covered by the orientation film 104, the surface over the patterns 103 is relatively smooth. Thus, in the process of rubbing the orientation film 104, the trace of the patterns 103 does not remain on surface of the rubbing roll 105. As a result, stripes are not formed on the orientation film 104 and therefore, high quality liquid crystal panels are constructed.

Alternatively, only at least the patterns 103 located between the liquid crystal panel portions 102a–102d and the starting position of the rubbing roll 15 need to be covered with the orientation film 104, and the remaining patterns do not have to be covered with the orientation film 104.

Therefore, the present examples and embodiments are to be considered as illustrative and not restrictive and the invention is not to be limited to the details given herein, but may be modified within the scope and equivalence of the appended claims.

What is claimed is:

1. A mother glass board comprising:

a substrate;

a plurality of liquid crystal panel portions located on the substrate;

an enclosure surrounding the plurality of liquid crystal panel portions;

a projection located on peripheral potion of the substrate, wherein the enclosure is positioned between the plurality of liquid crystal panel portions and the projection;

an orientation film formed over each of the crystal display panel portions, wherein each liquid crystal panel portion includes a black matrix located between the substrate and the associated orientation film and wherein the enclosure is made of the same material as the black matrix.

2. The mother glass board according to claim 1, wherein each liquid crystal panel portion includes:

a second electrode located on the substrate; and an insulating film formed between the display electrode and the second electrode.

3. The mother glass board according to claim 1, wherein the orientation film includes a polyimide resin.

4. A mother glass board comprising:

a substrate;

a plurality of liquid crystal panel portions located on the substrate;

an enclosure surrounding the plurality of liquid crystal panel portions;

a projection located on peripheral potion of the substrate, wherein the enclosure is positioned between the plurality of liquid crystal panel portions and the projection;

an orientation film formed over each of the crystal display panel portions, wherein each liquid crystal portion panel includes a display electrode located between the substrate and the associated orientation film and wherein the enclosure is made of the same material as the display electrode.

5. The mother glass according to claim 4, wherein each liquid crystal panel portion includes:

a second electrode located on the substrate; and an insulating film formed between the display electrode and the second electrode.

6. The mother glass board according to claim 4, wherein the orientation film includes a polyimide resin.

* * * * *

UNITED STATES PATENT AND TRADEMARK OFFICE
CERTIFICATE OF CORRECTION

PATENT NO.  : 6,100,584
DATED       : August 8, 2000
INVENTORS   : NORITAKE, Kazuto It is certified that error appears in the above-identified patent and that said Letters Patent are hereby corrected as shown below:

Title page, item [73], should read

Assignee: Sanyo Electric Co., Ltd., Osaka, Japan and
                Sony Corporation, Tokyo, Japan Signed and Sealed this Seventeenth Day of April, 2001

*Attest:*

NICHOLAS P. GODICI

*Attesting Officer*      *Acting Director of the United States Patent and Trademark Office*